United States Patent
Yamamoto et al.

(10) Patent No.: US 10,941,224 B2
(45) Date of Patent: Mar. 9, 2021

(54) COMPOSITE RESIN MATERIAL AND MOLDED BODY

(71) Applicants: TOHO KASEI CO., LTD., Yamatokoriyama (JP); TAIYO NIPPON SANSO CORPORATION, Tokyo (JP)

(72) Inventors: Hirokazu Yamamoto, Yamatokoriyama (JP); Kazuya Ninomiya, Yamatokoriyama (JP); Hirotaka Itami, Yamatokoriyama (JP); Takafumi Nakagawa, Yamatokoriyama (JP); Kentaro Miyoshi, Tokyo (JP); Katsunori Takada, Tokyo (JP); Toru Sakai, Tokyo (JP)

(73) Assignees: TOHO KASEI CO., LTD., Yamatokoriyama (JP); TAIYO NIPPON SANSO CORPORATION, Tokyo (JP)

( * ) Notice: Subject to any disclaimer, the term of this patent is extended or adjusted under 35 U.S.C. 154(b) by 25 days.

(21) Appl. No.: 16/339,754

(22) PCT Filed: Oct. 6, 2017

(86) PCT No.: PCT/JP2017/036540
§ 371 (c)(1),
(2) Date: Apr. 5, 2019

(87) PCT Pub. No.: WO2018/066706
PCT Pub. Date: Apr. 12, 2018

(65) Prior Publication Data
US 2020/0048376 A1    Feb. 13, 2020

(30) Foreign Application Priority Data
Oct. 7, 2016 (JP) .............................. JP2016-199345

(51) Int. Cl.
*C08F 14/24* (2006.01)
*C08K 3/04* (2006.01)

(52) U.S. Cl.
CPC .............. *C08F 14/24* (2013.01); *C08K 3/041* (2017.05)

(58) Field of Classification Search
CPC combination set(s) only.
See application file for complete search history.

(56) References Cited

U.S. PATENT DOCUMENTS

| | | | |
|---|---|---|---|
| 6,528,572 B1 * | 3/2003 | Patel | C08K 3/04 524/495 |
| 9,111,658 B2 * | 8/2015 | Shah | H01B 1/24 |
| 2008/0261051 A1 | 10/2008 | Ren et al. | |
| 2013/0310522 A1 | 11/2013 | Yajima et al. | |
| 2018/0208738 A1 * | 7/2018 | Komatsu | C08K 7/06 |

FOREIGN PATENT DOCUMENTS

| | | | |
|---|---|---|---|
| CN | 103102620 A | * 5/2013 | |
| JP | 2014-034591 | 2/2014 | |
| JP | 2015-030821 | 2/2015 | |
| WO | 2012/107991 | 8/2012 | |
| WO | 2014/122986 | 8/2014 | |
| WO | WO-2017022229 A1 | * 2/2017 | C08K 7/06 |

OTHER PUBLICATIONS

Ebnesajjad. (2015). Fluoroplastics, vol. 1—Non-Melt Processible Fluoropolymers—The Definitive User's Guide and Data Book (2nd Edition)—References. Elsevier. Retrieved from https://app.knovel.com/hotlink/pdf/id:kt00U9K063/fluoroplastics-volume/commercial-references (Year: 2015).*
Machine translation of CN 103102620 A, retrieved Jun. 2020 (Year: 2020).*
English translation of International Preliminary Report on Patentability dated Apr. 11, 2019, from International Application No. PCT/JP2017/036540, 5 pages.
Office Action dated Sep. 30, 2019 in related Chinese Patent Application No. 201780061418.5 (with translation) (15 pages).
Cao et al. Nonferrous metal special functional powder material preparation technology and application, Metallurgical Industry Press, Oct. 2011, with translation (4 pages).
Office Action in corresponding Taiwanese patent application No. 106134588 dated Feb. 24, 2020, and English translation thereof (8 pages).
International Search Report (English) and Written Opinion dated Dec. 26, 2017, from International Application No. PCT/JP2017/036540, 7 pages.

* cited by examiner

*Primary Examiner* — Nicole M. Buie-Hatcher
(74) *Attorney, Agent, or Firm* — Meunier Carlin & Curfman LLC

(57) ABSTRACT

Provided is a composite resin material that yields a resin molded body which has not only a low volume resistivity but also excellent electroconductivity and/or antistatic properties and whose volume resistivity is unlikely to be increased even when subjected to, for example, a washing treatment with ozone water. The composite resin material contains a polychlorotrifluoroethylene and carbon nanotubes and has an average particle diameter of 500 μm or smaller.

7 Claims, 1 Drawing Sheet

[FIG. 1]
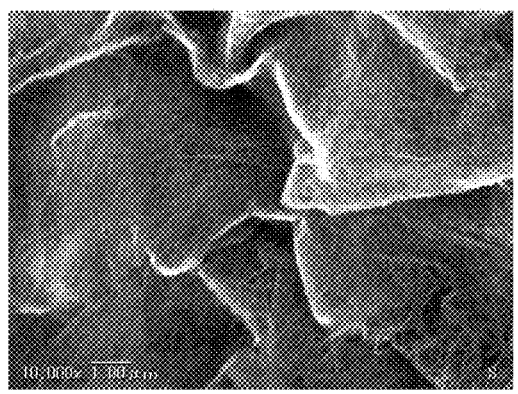
[FIG. 2]
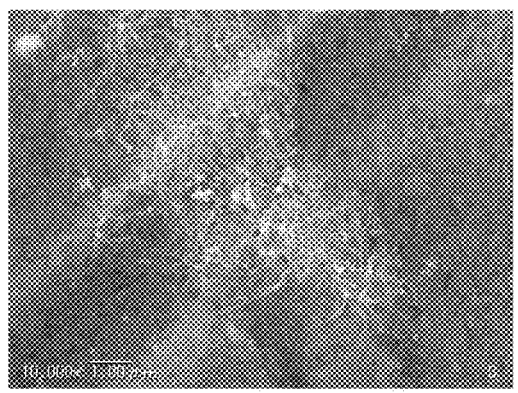

COMPOSITE RESIN MATERIAL AND MOLDED BODY

TECHNICAL FIELD

The present invention relates to: a composite resin material comprising a polychlorotrifluoroethylene and carbon nanotubes; and a molded body produced using the composite resin material.

BACKGROUND ART

In the fields of semiconductor components, automobile parts and the like, development and practical application of a novel electroconductive material obtained by forming a composite between a resin material and a carbon nanomaterial such as a carbon nanotube are expected. In the utilization of a carbon nanomaterial in an electroconductive material, the dispersibility of the carbon nanomaterial in a resin material presents a problem in some cases, and various attempts have been made to improve the dispersibility of a carbon nanomaterial.

For example, Patent Document 1 discloses a method of producing composite resin material particles using carbon dioxide in a subcritical or supercritical state, whose particles contain particles of a fluorine resin, such as a polytetrafluoroethylene, and a carbon nanomaterial.

Patent Document 2 discloses a method of producing composite resin particles in which particles of a fluorine resin, such as a polytetrafluoroethylene, and a carbon nanomaterial are allowed to form a composite using a ketone-based solvent.

PRIOR ART DOCUMENT

Patent Document

[Patent Document 1] JP 2014-34591 A
[Patent Document 2] JP 2015-30821 A

SUMMARY OF THE INVENTION

Problems to be Solved by the Invention

When a semiconductor component contains a contaminant such as a metal impurity or a surface-adsorbing chemical substance, the contaminant potentially adversely affects the reliability of a semiconductor product obtained from the semiconductor component. Accordingly, in the semiconductor production, the washing step for removal of contaminants such as metal impurities and surface-adsorbing chemical substances from a wafer and the like is viewed as an important step, and various washing methods have been examined. For example, washing with ozone water or SPM washing with sulfuric acid, hydrogen peroxide and the like is performed. The present inventors discovered that a washing treatment of a molded body produced using a carbon nanomaterial-containing electroconductive material with ozone water or the like sometimes results in an increase in volume resistivity and thus a reduction in electroconductivity. In addition, in molded bodies required to have antistatic properties, there are cases where a strong acid, such as sulfuric acid, causes an increase in volume resistivity and thus deterioration of antistatic properties. Therefore, the present inventors investigated materials whose volume resistivity is unlikely to be increased even when subjected to, for example, a washing treatment with ozone water.

In view of the above, an object of the present invention is to provide a resin material that yields a resin molded body which has a low volume resistivity and whose volume resistivity is unlikely to be increased even when subjected to, for example, a washing treatment with ozone water.

The present inventors discovered that the above-described object can be achieved by the below-described composite resin material of the present invention.

That is, the present invention encompasses the following preferred modes.

[1] A composite resin material, comprising a polychlorotrifluoroethylene and carbon nanotubes and having an average particle diameter of 500 μm or smaller.

[2] The composite resin material according to [1], comprising the carbon nanotubes in an amount of 0.01 to 2.0% by mass based on a total amount of the composite resin material.

[3] The composite resin material according to [1] or [2], having a specific surface area of 1.0 to 6.0 m²/g as measured by a BET method.

[4] The composite resin material according to any one of [1] to [3], having a volume resistivity of $1.0 \times 10^8$ Ω·cm or lower as measured in accordance with JIS K6911.

[5] The composite resin material according to any one of [1] to [4], wherein the polychlorotrifluoroethylene has a flow value of 0.8 cm³/sec or higher.

[6] A molded body produced using the composite resin material according to any one of [1] to [5].

[7] The molded body according to [6], wherein the carbon nanotubes have an average length of 50 μm or longer.

[8] The molded body according to [6] or [7], having a shape selected from the group consisting of a plate shape, a rod shape, a film shape, a sheet shape, an aggregate shape, and a tubular shape.

Effects of the Invention

A molded body produced using the composite resin material of the present invention has a low volume resistivity, and its volume resistivity is unlikely to be increased even when the molded body is subjected to, for example, a washing treatment with ozone water or the like.

BRIEF DESCRIPTION OF THE DRAWINGS

FIG. 1 is an image of CNTs in a molded body produced by compression-molding the resin material obtained in Example 3.

FIG. 2 is an image of CNTs in a molded body produced by melt-kneading the resin material obtained in Example 3.

MODES FOR CARRYING OUT THE INVENTION

Embodiments of the present invention will now be described in detail. It is noted here, however, that the scope of the present invention is not restricted to the below-described embodiments, and various modifications, additions and deletions can be made within a range that does not depart from the gist of the present invention.

The composite resin material of the present invention comprises a polychlorotrifluoroethylene and carbon nanotubes. The composite resin material of the present invention is a material obtained by forming a composite of a polychlorotrifluoroethylene and carbon nanotubes, and the carbon nanotubes exist at least on the surfaces and/or in the surface layers of polychlorotrifluoroethylene particles. For example, the carbon nanotubes are at least partially supported on or embedded in the surfaces of the polychlorotrifluoroethylene particles. The carbon nanotubes may be supported being adhered to or partially embedded in the surfaces of the polychlorotrifluoroethylene particles, or the carbon nanotubes may be completely embedded in the surface layers of the polychlorotrifluoroethylene particles.

The composite resin material of the present invention has an average particle diameter of 500 μm or smaller. When the average particle diameter is larger than 500 μm, a molded body in which the carbon nanotubes are uniformly dispersed cannot be obtained and, particularly in a thin molded body, its volume resistivity cannot be reduced sufficiently. The composite resin material of the present invention has an average particle diameter of preferably 250 μm or smaller, more preferably 100 μm or smaller, still more preferably 50 μm or smaller, particularly preferably 25 μm or smaller, extremely preferably 12 μm or smaller. When the average particle diameter is not larger than the above-described upper limit, the volume resistivity of an eventually obtained molded body is likely to be reduced, which is preferred. The lower limit value of the average particle diameter of the composite resin material of the present invention is not particularly restricted; however, it is usually 1 μm or larger. The average particle diameter of the composite resin material is a median diameter ($D_{50}$), which means a particle diameter at an integrated value of 50% in a particle size distribution determined by a laser diffraction-scattering method, and is measured using a laser diffraction-scattering particle size distribution analyzer.

In the composite resin material of the present invention, the polychlorotrifluoroethylene and the carbon nanotubes form a composite and the average particle diameter is controlled in the above-described range, whereby the volume resistivity of a molded body produced using the composite resin material of the present invention can be effectively reduced, and the molded body can be imparted with antistatic properties and/or electroconductivity. In addition, an increase in the volume resistivity caused by a washing treatment with ozone water or the like can be suppressed.

Examples of the polychlorotrifluoroethylene (hereinafter, also referred to as "PCTFE") contained in the composite resin material of the present invention include homopolymers of chlorotrifluoroethylene (hereinafter, also referred to as "CTFE"), and copolymers of CTFE and at least one monomer polymerizable with CTFE. From the standpoint of the ease of suppressing an increase in the volume resistivity caused by a washing treatment with ozone water or the like, the PCTFE contains a CTFE-based structural unit in an amount of 90 to 100% by mole, more preferably 95 to 100% by mole, still more preferably 98 to 100% by mole, based on all structural units in the PCTFE. The amount of each structural unit in the PCTFE can be determined by, for example, a melt NMR analysis, a fluorine content analysis, and an infrared absorption spectrum analysis of the composite resin material of the present invention.

When the PCTFE is a copolymer of CTFE and a monomer (a) that is polymerizable with CTFE, examples of the monomer (a) include, but not particularly limited to, tetrafluoroethylene, ethylene, vinylidene fluoride, perfluoro (alkylvinyl) ethers, vinyl monomers represented by the following Formula (I):

[wherein, $X^1$, $X^3$ and $X^4$ each independently represent a hydrogen atom or a fluorine atom; $X^2$ represents a hydrogen atom, a fluorine atom or a chlorine atom; and n represents an integer of 1 to 10], alkylperfluorovinyl ether derivatives represented by the following Formula (II):

[wherein, Rf represents a perfluoroalkyl group having 1 to 5 carbon atoms], and unsaturated carboxylic acids.

The PCTFE may be a copolymer of CTFE and any one of the above-exemplified monomers (a), or a copolymer of CTFE and two or more of the above-exemplified monomers (a).

Examples of the perfluoro(alkylvinyl) ethers include perfluoro(methylvinyl ether), perfluoro(ethylvinyl ether), perfluoro(propylvinyl ether), and perfluoro(butylvinyl ether).

Examples of the vinyl monomers represented by Formula (I) include hexafluoropropylene, perfluoro(1,1,2-trihydro-1-hexene), perfluoro(1,1,5-trihydro-1-pentene), and perfluoro (alkyl)ethylenes represented by the following Formula (III):

[wherein, $X^5$ represents H, F or $CF_3$; and $Rf^5$ represents a perfluoroalkyl group having 1 to 10 carbon atoms].

Among the perfluoro(alkyl)ethylenes, perfluoro(butyl) ethylene is preferred.

As the alkylperfluorovinyl ether derivatives represented by Formula (II), those wherein Rf is a perfluoroalkyl group having 1 to 3 carbon atoms are preferred, and $CF_2=CF-OCH_2-CF_2CF_3$ is more preferred.

Examples of the unsaturated carboxylic acids include unsaturated aliphatic carboxylic acids having 3 to 6 carbon atoms, such as (meth)acrylic acid, crotonic acid, maleic acid, fumaric acid, itaconic acid, citraconic acid, mesaconic acid and aconitic acid, and the unsaturated carboxylic acids may be unsaturated aliphatic polycarboxylic acids having 3 to 6 carbon atoms. Examples of the unsaturated aliphatic polycarboxylic acids include maleic acid, fumaric acid, itaconic acid, citraconic acid, mesaconic acid and aconitic acid, and the unsaturated aliphatic polycarboxylic acids may be acid anhydrides when they can take an anhydride form such as maleic acid, itaconic acid, citraconic acid or the like.

The monomer (a) is preferably at least one selected from the group consisting of tetrafluoroethylene, ethylene, vinylidene fluoride, perfluoro(alkylvinyl) ethers, and vinyl monomers represented by the above-described Formula (I).

In the composite resin material of the present invention, the PCTFE has a flow value of preferably 0.8 $cm^3$/sec or higher, more preferably 1.0 $cm^3$/sec or higher. When the flow value is not less than the above-described lower limit, the mechanical properties and the moldability of the composite resin material are likely to be improved, which is preferred. The upper limit of the flow value is, for example, 2.0 $cm^3$/sec. The flow value is determined by extruding the PCTFE through an orifice of 1 mm in diameter and 1 mm in length at a temperature of 230° C. under a load of 100 kgf and measuring the volume of the resin flowing through the orifice per second using a flow tester (e.g., "CFT-500C" manufactured by Shimadzu Corporation).

In the composite resin material of the present invention, the PCTFE has a melting point of preferably 130 to 290° C., more preferably 160 to 270° C., still more preferably 180 to 250° C. The moldability is likely to be improved when the melting point is not lower than the above-described lower limit, and the resin is likely to attain optimum mechanical properties when the melting point is not higher than the above-described upper limit, which are both preferred. The melting point of the PCTFE is measured in accordance with ASTM-D4591 using a differential scanning calorimeter (DSC).

The amount of the PCTFE contained in the composite resin material of the present invention is preferably not less than 98.0% by mass, more preferably not less than 99.5% by mass, still more preferably not less than 99.8% by mass, based on a total amount of the composite resin material. When the amount of the PCTFE is not less than the above-described lower limit, the mechanical properties and the moldability of the composite resin material are likely to be improved, which is preferred. The upper limit of the amount of the PCTFE is not particularly restricted; however, it is about 99.99% by mass. The amount of the PCTFE contained in the composite resin material is determined by a carbon component analysis method.

The carbon nanotubes (hereinafter, also referred to as "CNTs") contained in the composite resin material of the present invention have a structure in which one or more graphene sheets constituted by six-membered rings of carbon atoms are wound in a cylindrical form. The CNTs are single-wall CNTs (single-wall carbon nanotubes) in which a single graphene sheet is concentrically wound, or multi-wall CNTs (multi-wall carbon nanotubes) in which two or more graphene sheets are concentrically wound. These carbon nanomaterials may be used individually, or in any combination thereof. From the standpoints of the ease of forming a composite of the carbon nanotubes with PCTFE particles and the ease of reducing the volume resistivity, the carbon nanotubes are more preferably single-wall carbon nanotubes.

The amount of the carbon nanotubes contained in the composite resin material of the present invention is preferably 0.01 to 2.0% by mass, more preferably 0.02 to 0.5% by mass, still more preferably 0.025 to 0.2% by mass, based on a total amount of the composite resin material. When the amount of the carbon nanotubes is not less than the above-described lower limit, the antistatic properties or the electroconductivity is likely to be improved and the volume resistivity is thus likely to be reduced, which is preferred. The amount of the carbon nanotubes is preferably not greater than the above-described upper limit since the volume resistivity is likely to be efficiently reduced. The amount of the carbon nanotubes contained in the composite resin material is determined by a carbon component analysis method.

The composite resin material of the present invention has a specific surface area of preferably 1.0 to 6.0 m$^2$/g, more preferably 1.5 to 3.0 m$^2$/g, still more preferably 2.0 to 3.0 m$^2$/g, as measured in accordance with JIS 28830. The specific surface area is preferably not smaller than the above-described lower limit from the standpoint of the ease of improving the adhesion between the PCTFE particles and the carbon nanotubes, and the specific surface area is also preferably not larger than the above-described upper limit from the standpoint of the ease of producing the composite resin material. Specifically, the specific surface area of the composite resin material is measured by a BET method, which is a commonly-used specific surface area measurement method, using a specific surface area/pore distribution analyzer based on a constant-volume gas adsorption method (e.g., BELSORP-mini II manufactured by Bel Japan Corp.).

In a mode where the composite resin material of the present invention is used in an application that requires antistatic properties, the composite resin material of the present invention has a volume resistivity of preferably $1.0 \times 10^8$ Ω·cm or lower, more preferably $1.0 \times 10^7$ Ω·cm or lower, still more preferably $1.0 \times 10^6$ Ω·cm or lower, as measured in accordance with JIS K6911. When the volume resistivity is not higher than the above-described upper limit, good antistatic properties are attained. Further, in a mode where the composite resin material of the present invention is used in an application that requires electroconductivity, the composite resin material of the present invention has a volume resistivity of preferably $1.0 \times 10^6$ Ω·cm or lower, more preferably $1.0 \times 10^5$ Ω·cm or lower, still more preferably $1.0 \times 10^4$ Ω·cm or lower, as measured in accordance with JIS K6911. When the volume resistivity is not higher than the above-described upper limit, good electroconductivity is attained. The lower limit value of the volume resistivity of the composite resin material is not particularly restricted and may be 0 Ω·cm or higher; however, it is usually 10 Ω·cm or higher. The volume resistivity of the composite resin material is measured using a resistivity meter (e.g., "LORESTA" or "HIRESTA" manufactured by Mitsubishi Chemical Analytech Co., Ltd.) in accordance with JIS K6911 for a molding material or a test piece prepared by cutting. For example, when the measurement is performed using a test piece of φ110×10 mm prepared by compression molding, the composite resin material preferably shows the above-described volume resistivity.

In the production of an antistatic material or an electroconductive material, an addition of an electroconductive material or the like to a resin, which is performed for the purpose of lowering the volume resistivity, may reduce the mechanical strength intrinsic to the resin. According to the composite resin material of the present invention, even when the composite resin material has a volume resistivity in the above-described range, it can yield a resin molded body in which a reduction in the mechanical strength is suppressed, although the reason for this is not clear. Specifically, the composite resin material of the present invention preferably has the below-described mechanical strength.

The composite resin material of the present invention has a tensile elastic modulus of preferably 1,000 to 2,100 MPa, more preferably 1,200 to 1,900 MPa, still more preferably 1,300 to 1,800 MPa. The tensile elastic modulus of the composite resin material is measured in accordance with JIS K7137-2-A for a dumbbell test piece at a load of 5 kN and a rate of 1 mm/min using a tensile tester (e.g., "TENSILON Universal Material Testing Instrument" manufactured by A&D Co., Ltd.).

The composite resin material of the present invention has a tensile strength of preferably 30 to 55 MPa, more preferably 35 to 50 MPa, still more preferably 35 to 45 MPa. The tensile strength of the composite resin material is measured using the same test piece and tester as in the measurement of the tensile elastic modulus.

The composite resin material of the present invention has a tensile elongation (maximum point) of preferably 4.0 to 7.0%, more preferably 4.5 to 6.5%, still more preferably 5.0 to 6.0%. The tensile elongation of the composite resin material is measured using the same test piece and tester as in the measurement of the tensile elastic modulus.

The composite resin material of the present invention has a tensile elongation (breaking point) of preferably 15 to 60%, more preferably 20 to 60%, still more preferably 25 to 55%, particularly preferably 30 to 50%. The tensile elongation of the composite resin material is measured using the same test piece and tester as in the measurement of the tensile elastic modulus.

The composite resin material of the present invention has a compressive elastic modulus of preferably 1,000 to 1,500 MPa, more preferably 1,100 to 1,400 MPa, still more preferably 1,100 to 1,300 MPa. The compressive elastic modulus of the composite resin material is measured for a test piece of φ8×20 mm at a load of 5 kN and a rate of 1 mm/min using a compression tester (e.g., "TENSILON Universal Material Testing Instrument" manufactured by A&D Co., Ltd.).

The composite resin material of the present invention has a compressive strength (1% deformation) of preferably 8 to 15 MPa, more preferably 9 to 14 MPa, still more preferably 10 to 13 MPa. The compressive strength of the composite resin material is measured using the same test piece and tester as in the measurement of the compressive elastic modulus.

The composite resin material of the present invention has a bending elastic modulus of preferably 1,300 to 2,100 MPa, more preferably 1,450 to 1,950 MPa, still more preferably 1,500 to 1,800 MPa. The bending elastic modulus of the composite resin material is measured for a test piece of 4 mm in thickness, 10 mm in width and 80 mm in length at a load of 5 kN and a rate of 10 mm/min using a bending tester (e.g., "TENSILON Universal Material Testing Instrument" manufactured by A&D Co., Ltd.).

The composite resin material of the present invention has a bending strength of preferably 50 to 90 MPa, more preferably 65 to 80 MPa, still more preferably 65 to 75 MPa. The bending strength of the composite resin material is measured using the same test piece and tester as in the measurement of the bending elastic modulus.

A method of producing each test piece for the above-described measurements of mechanical strength will now be described. First, the composite resin material of the present invention is placed in a mold, and appropriate pretreatments (e.g., pre-drying and granulation) are performed as required, followed by heating at a temperature of 200° C. or higher for at least 2 hours. After the heating performed for a prescribed time, the composite resin material is cooled while being compressed with a prescribed pressure to produce a molded body. The thus obtained molded body may be directly used as a test piece, or a test piece may be prepared by cutting the molded body.

The composite resin material of the present invention is a material obtained by forming a composite of a polychlorotrifluoroethylene and carbon nanotubes. A method of producing the composite resin material of the present invention is not particularly restricted as long as the method can yield a composite resin material which preferably has the above-described physical properties and in which the carbon nanotubes exist at least on the surface and/or in the surface layer of the polychlorotrifluoroethylene. The composite resin material of the present invention can be produced by forming a composite between particles of the polychlorotrifluoroethylene and the carbon nanotubes using, for example, carbon dioxide in a subcritical or supercritical state in accordance with the method described in JP 2014-34591 A or a ketone-based solvent in accordance with the method described in JP 2015-30821 A.

A production method in which a composite is formed between particles of a polychlorotrifluoroethylene and carbon nanotubes using carbon dioxide in a subcritical or supercritical state will now be described concretely. In a first step, carbon nanotubes are dispersed in a solvent to prepare a carbon nanotube dispersion. Examples of the solvent include water, alcohol-based solvents (e.g., ethanol, n-butyl alcohol, isopropyl alcohol, and ethylene glycol), ester-based solvents (e.g., ethyl acetate), ether-based solvents (e.g., diethyl ether and dimethyl ether), ketone-based solvents (e.g., methyl ethyl ketone, acetone, diethyl ketone, methyl propyl ketone, and cyclohexanone), aliphatic hydrocarbon-based solvents (e.g., hexane and heptane), aromatic hydrocarbon-based solvents (e.g., toluene and benzene), and chlorinated hydrocarbon-based solvents (e.g., dichloromethane, chloroform, and chlorobenzene). These solvents may be used individually, or two or more thereof may be used in combination. From the standpoint of the ease of allowing the polychlorotrifluoroethylene and the carbon nanotubes to form a composite, it is preferred to use a solvent with which the surfaces of the particles of the polychlorotrifluoroethylene are readily swollen and, specifically, it is preferred to use a ketone-based solvent.

From the standpoint of the ease of monodispersing the carbon nanotubes in the solvent, the amount of the solvent to be contained in the carbon nanotube dispersion is preferably 20,000 to 1,000,000 parts by mass, more preferably 30,000 to 300,000 parts by mass, still more preferably 50,000 to 200,000 parts by mass, with respect to 100 parts by mass of the carbon nanotubes contained in the carbon nanotube dispersion.

The carbon nanotubes used in the production of the composite resin material of the present invention have an average length of preferably 50 to 600 μm, more preferably 50 to 300 μm, still more preferably 100 to 200 μm. The average length of the carbon nanotubes is measured using a scanning electron microscope (SEM or FE-SEM) or a transmission electron microscope (TEM).

The carbon nanotubes can be produced by any conventional production method. Specific examples thereof include catalytic hydrogen reduction of carbon dioxide, an arc discharge method, a laser vaporization method, a vapor-phase growth method such as a CVD method, a vapor-phase flow method, a HiPco method in which carbon monoxide is allowed to react along with an iron catalyst under high temperature and high pressure and to grow in a gas phase, and an oil furnace method. Commercially available carbon nanotubes, such as "NC7000" manufactured by Nanocyl Corp., may be used as well.

When dispersing the carbon nanotubes in the solvent, a dispersant may be used for the purpose of improving the dispersibility of the carbon nanotubes. Examples of the dispersant include acrylic dispersants; synthetic polymers, such as polyvinylpyrrolidone and polyaniline sulfonate; DNAs; peptides; and organic amine compounds. These dispersants may be used individually, or two or more thereof may be used in combination. From the standpoint of the ease of reducing the amount of the dispersant remaining in a molded body to be eventually obtained, the dispersant preferably has a boiling point that is lower than the temperature at which the composite resin material of the present invention is molded. In cases where a dispersant is used, the amount of the dispersant to be contained in the carbon nanotube dispersion may be selected as appropriate in accordance with the types and the amounts of the carbon nanotubes, the solvent and the dispersant. For example, the amount of the dispersant to be used is preferably 100 to 6,000 parts by mass, more preferably 200 to 3,000 parts by mass, still more preferably 300 to 1,000 parts by mass, with respect to 100 parts by mass of the carbon nanotubes.

When water is used as the solvent in the above-described first step, the carbon nanotube dispersion is mixed with an alcoholic solvent or the like prior to the below-described second step. The reason for this is because the affinity between the PCTFE particles added in the subsequent second step and water is low and it is thus difficult to disperse the PCTFE particles in the carbon nanotube dispersion in which water is used as the solvent. Accordingly, by mixing the carbon nanotube dispersion with an alcohol-based solvent, the affinity between the PCTFE particles and the carbon nanotube dispersion can be improved.

Next, in the second step, the PCTFE particles are added to the carbon nanotube dispersion, and the resultant is stirred to prepare a mixed slurry in which the carbon nanotubes and the PCTFE particles are dispersed.

When the PCTFE particles are added to the carbon nanotube dispersion, the carbon nanotubes in the dispersion gradually adsorb to the PCTFE surface. In this process, by adjusting the temperature of the solvent, the dispersion concentration of the carbon nanotubes and that of the PCTFE particles as well as the addition rate of the PCTFE particles and the like as appropriate, the carbon nanotubes can be adsorbed to the PCTFE surface while maintaining a highly dispersed state of the carbon nanotubes and the PCTFE particles. This method enables to uniformly disperse the carbon nanotubes on the surfaces of the PCTFE particles even at a low addition concentration. Further, even when long carbon nanotubes are used, the carbon nanotubes can be uniformly dispersed on the surfaces of the PCTFE particles without deterioration of their properties. As for the addition of the PCTFE particles, the PCTFE particles may be added as is or in the form of a dispersion in which the PCTFE particles are dispersed in a solvent in advance.

The PCTFE particles used in the production of the composite resin material of the present invention have an average particle diameter of preferably 5 to 500 µm, more preferably 8 to 250 µm, still more preferably 10 to 100 µm, particularly preferably 10 to 50 µm, extremely preferably 10 to 25 µm. The average particle diameter of the PCTFE particles is preferably not larger than the above-described upper limit from the standpoints of the ease of improving the dispersibility of the carbon nanotubes in a molded body produced from the composite resin material and the ease of uniformly improving the antistatic properties and/or the electroconductivity. The average particle diameter of the PCTFE particles is preferably not smaller than the above-described lower limit from the standpoint of the ease of producing the composite resin material. The average particle diameter of the PCTFE particles is a median diameter ($D_{50}$), which means a particle diameter at an integrated value of 50% in a particle size distribution determined by a laser diffraction-scattering method, and is measured using a laser diffraction-scattering particle size distribution analyzer.

The PCTFE particles used in the production of the composite resin material of the present invention have a specific surface area of preferably 1.0 to 6.0 $m^2/g$, more preferably 1.5 to 3.0 $m^2/g$, still more preferably 2.0 to 3.0 $m^2/g$, as measured in accordance with JIS Z8830. The specific surface area of the PCTFE particles is preferably not larger than the above-described upper limit from the standpoint of the ease of improving the adhesion between the PCTFE particles and the carbon nanotubes, while the specific surface area of the PCTFE particles is preferably not smaller than the above-described lower limit from the standpoint of the ease of producing the composite resin material. Specifically, the specific surface area of the PCTFE particles is measured by a BET method, which is a commonly-used specific surface area measurement method, using a specific surface area/pore distribution analyzer based on a constant-volume gas adsorption method.

The above descriptions regarding to the structure, the flow value and the melting point of the PCTFE in the composite resin material of the present invention also apply to the PCTFE particles used in the production of the composite resin material of the present invention since these properties do not change before and after the composite formation.

A method of producing the PCTFE particles that have an average particle diameter and a specific surface area in the above-described respective preferred ranges is not particularly restricted, and examples thereof include: a method of homopolymerizing CTFE or copolymerizing CTFE with at least one monomer polymerizable with CTFE and subsequently spray-drying a dispersion containing a reactive polymer; a method of mechanically pulverizing the resulting PCTFE polymer using a pulverizer, such as a hammer mill, a turbo mill, a cutting mill or a jet mill; and freeze-pulverization in which the resulting PCTFE polymer is mechanically pulverized at a temperature of lower than room temperature. From the standpoint of the ease of obtaining PCTFE particles having the desired average particle diameter and specific surface area, it is preferred to produce the PCTFE particles by freeze-pulverization.

In the case of producing the PCTFE particles by freeze-pulverization, the pulverization is performed while cooling the PCTFE particles with a cooling medium such as liquid carbon dioxide gas or liquid nitrogen. The temperature during the pulverization is preferably −200° C. to 20° C., more preferably −180° C. to −20° C., still more preferably −150° C. to −50° C.

The PCTFE particles having an average particle diameter in the above-described range may also be produced by adjusting the average particle diameter through a classification step using a sieve or an air flow.

Next, in a third step, the mixed slurry obtained in the second step is fed to a pressure-resistant vessel, and carbon dioxide is fed at a specific rate thereto while maintaining such temperature and pressure that bring carbon dioxide into a subcritical or supercritical state in the pressure-resistant vessel, whereby the pressure-resistant vessel is filled with carbon dioxide. As this carbon dioxide, any of liquid carbon dioxide, carbon dioxide in a gas-liquid mixed state and gaseous carbon dioxide may be used. The term "supercritical state" used herein for carbon dioxide refers to a state in which carbon dioxide has a temperature of not lower than the critical point and a pressure of not lower than the critical point, specifically a state in which carbon dioxide has a temperature of 31.1° C. or higher and a pressure of 72.8 atm or higher. Further, the term "subcritical state" used herein refers to a state in which carbon dioxide has a pressure of not lower than the critical point and a temperature of not higher than the critical point.

In the third step, the solvent and the dispersant that are contained in the mixed slurry dissolve into carbon dioxide, and the carbon nanotubes dispersed in the mixed slurry adhere to the PCTFE particles.

From the standpoint of the ease of suppressing agglutination of the carbon nanotubes and allowing the carbon nanotubes to uniformly adhere to the surfaces of the PCTFE particles, the feeding rate of carbon dioxide is, for example, preferably 0.25 g/min or lower, more preferably 0.07 g/min or lower, still more preferably 0.05 g/min or lower, with respect to 1 mg of the dispersant contained in the mixed slurry.

In the subsequent fourth step, while maintaining such temperature and pressure that bring carbon dioxide into a subcritical or supercritical state for a prescribed time, carbon dioxide is discharged from the pressure-resistant vessel along with the solvent and the dispersant that are dissolved in carbon dioxide.

Next, in a fifth step, an entrainer having a high affinity to the dispersant is added to the pressure-resistant vessel while maintaining the state of the fourth step. By this, the remaining dispersant can be efficiently removed. As the entrainer, for example, the solvent used in the first step for the preparation of the carbon nanotube dispersion may be used. Specifically, when an organic solvent is used in the first step, the same organic solvent may be used as the entrainer. When water is used as the solvent in the first step, it is preferred to use an alcohol-based solvent as the entrainer. It is noted here that the fifth step is an optional step for efficiently removing the dispersant and is not an indispensable step. The dispersant can also be removed by, for example, maintaining the fourth step without an addition of an entrainer.

Next, in a sixth step, carbon dioxide is removed from the pressure-resistant vessel by reducing the pressure in the pressure-resistant vessel, whereby the composite resin material of the present invention can be obtained. In this process, depending on the method of removing carbon dioxide, carbon dioxide and the solvent may remain in the resulting composite resin material. Accordingly, the remaining carbon dioxide and solvent can be efficiently removed by exposing the resulting composite resin material to vacuum or by heating the composite resin material.

The present invention also relates to a molded body produced using the composite resin material of the present invention. The molded body produced using the composite resin material of the present invention not only has excellent antistatic properties and/or electroconductivity but also maintains mechanical strength; therefore, it is suitable for various applications including electronics, electrical instruments, machines, and vehicles. For example, the molded body is suitable for applications such as current collectors for capacitors and batteries, heat dissipation plates, heat radiating components, electronic components, parts for semiconductor production apparatuses, bearings, nozzles required to have antistatic properties, hoses, tubes, containers, sheets, gaskets, packings, and fixation roller surfaces of copying machines that require the control of electroconductivity. The shape of the molded body is not particularly restricted, and the molded body may take any shape selected from the group consisting of, for example, a plate shape, a rod shape, a film shape, a sheet shape, an aggregate shape, and a tubular (cylindrical) shape.

As a method of molding the molded body of the present invention, any method that is known and commonly used may be employed, and the method may be selected as appropriate in accordance with the intended use and the desired shape of the molded body. Examples of the method include molding methods, such as compression molding, hot-coining molding, press molding, an SMC method, a matched die method, and laminate molding with a metal, a resin, a woven fabric, a non-woven fabric or the like. From the standpoints of mechanical properties, electrical properties and moldability, the molded body is preferably produced by compression molding or hot-coining molding.

The molded body of the present invention is produced using a polychlorotrifluoroethylene-containing composite resin material; therefore, when a method that applies a shearing force to the composite resin material through melt molding or the like, such as an extrusion molding method or an injection molding method, is employed, the carbon nanotubes are cut and the electroconductivity is thereby reduced, as a result of which the volume resistivity is increased. From this standpoint, the molded body of the present invention is preferably produced by a method that does not apply a shearing force to the composite resin material, such as compression molding. The compression molding is preferably performed by, for example, a method in which the composite resin material of the present invention is placed in a mold; appropriate pretreatments (e.g., pre-drying and granulation) are subsequently performed as required, followed by heating at a temperature of 200° C. or higher for at least 2 hours; and, after the heating performed for a prescribed time, the composite resin material is cooled while being compressed with a prescribed pressure. Accordingly, in a preferred mode of the present invention, since cutting of the carbon nanotubes during molding is suppressed, the carbon nanotubes contained in the molded body of the present invention have an average length of preferably 50 to 300 µm, more preferably 70 to 250 µm, still more preferably 100 to 200 µm. The average length can be measured by the method described below in the section of Examples.

EXAMPLES

The present invention will now be described concretely by way of examples thereof; however, the below-described examples do not restrict the scope of the present invention.
[Measurement of Average Particle Diameter $D_{50}$]

The average particle diameter of the composite resin material of the present invention and that of the PCTFE particles used in the production of the composite resin material of the present invention were each determined in terms of average particle diameter $D_{50}$ by measuring the particle size distribution using a laser diffraction-scattering particle size distribution analyzer ("MT3300II" manufactured by Nikkiso Co., Ltd.).
[Measurement of Specific Surface Area]

The specific surface area of the composite resin material of the present invention and that of the PCTFE particles used in the production of the composite resin material of the present invention were measured in accordance with JIS Z8830 using a specific surface area/pore distribution analyzer (BELSORP-mini II manufactured by Bel Japan Corp.).
[Measurement of Volume Resistivity]

A test piece of φ110×10 mm was prepared by compression molding and used as a measurement sample.

The volume resistivity was measured in accordance with JIS K6911 using a resistivity meter ("LORESTA" or "HIRESTA" manufactured by Mitsubishi Chemical Analytech Co., Ltd.).
[Measurement of Mechanical Strength]
(Tensile Elastic Modulus, Tensile Strength, and Tensile Elongation (Breaking Point))

A dumbbell test piece according to JIS K7137-2-A was prepared by compression molding and used as a measurement sample.

The tensile elastic modulus, the tensile strength and the tensile elongation (breaking point) of the measurement sample were measured in accordance with JIS K7137-2-A at a load of 5 kN and a rate of 1 mm/min using a tensile tester ("TENSILON Universal Material Testing Instrument" manufactured by A&D Co., Ltd.).
(Compressive Elastic Modulus and Compressive Strength (1% Deformation))

A test piece of φ8×20 mm was prepared by compression molding and used as a measurement sample.

The compressive elastic modulus and the compressive strength (1% deformation) of the measurement sample were measured in accordance with JIS K7181 at a load of 5 kN and a rate of 1 mm/min using a compression tester ("TENSILON Universal Material Testing Instrument" manufactured by A&D Co., Ltd.).
(Bending Elastic Modulus and Bending Strength)

A test piece of 4 mm in thickness, 10 mm in width and 80 mm in length was prepared by compression molding and used as a measurement sample.

The bending elastic modulus and the bending strength of the measurement sample were measured in accordance with JIS K7171 at a load of 5 kN and a rate of 10 mm/min using a bending tester ("TENSILON Universal Material Testing Instrument" manufactured by A&D Co., Ltd.).
[Production of Molded Bodies]

The composite resin materials obtained in the below-described Examples and Comparative Examples were each uniformly filled into a mold for molding material in a certain amount, and appropriate pretreatments such as pre-drying were performed in accordance with the desired dimensions of the resulting molded body. After the pretreatments, the resin was heat-melted for at least 2 hours in a hot-air circulation-type electric furnace in which the mold temperature was set at 200° C. or higher. After the heating performed for a prescribed time, the mold was taken out of the electric furnace and subsequently cooled to around normal temperature while compressing the composite resin material at a surface pressure of not less than 25 kg/cm² using an oil press, whereby a molded body was obtained from the composite resin material.
[Sulfuric Acid-Hydrogen Peroxide Mixture (SPM) Immersion Treatment]

In a glass beaker, 98% sulfuric acid and 30% hydrogen peroxide were mixed at a weight ratio of 2:1 to prepare a sulfuric acid-hydrogen peroxide mixture. When the temperature of the thus prepared sulfuric acid-hydrogen peroxide mixture reached a highest point due to the reaction heat, dumbbell test pieces according to JIS K7137-2-A that were obtained from the composite resin materials of the below-described Examples and Comparative Examples were each added thereto and immersed for 24 hours. After the 24-hour immersion, the preparation of sulfuric acid-hydrogen peroxide mixture and the 24-hour immersion were repeated, and the volume resistivity and the weight change rate were determined in accordance with JIS K6911 for each of the test pieces immersed for a total of 7 days.
[IPA Immersion Treatment]

IPA was poured into a glass beaker, and dumbbell test pieces according to JIS K7137-2-A that were obtained from the composite resin materials of the below-described Examples and Comparative Examples were each added thereto and immersed for 7 days. For each of the test pieces immersed for 7 days, the volume resistivity and the weight change rate were determined in accordance with JIS K6911.
[Thinner Immersion Treatment]

A thinner was poured into a glass beaker, and dumbbell test pieces according to JIS K7137-2-A that were obtained from the composite resin materials of the below-described Examples and Comparative Examples were each added thereto and immersed for 7 days. For each of the test pieces immersed for 7 days, the volume resistivity and the weight change rate were determined in accordance with JIS K6911.
[Hydrogen Peroxide Immersion Treatment]

Hydrogen peroxide (30%) was poured into a glass beaker, and dumbbell test pieces according to JIS K7137-2-A that were obtained from the composite resin materials of the below-described Examples and Comparative Examples were each added thereto and immersed for 7 days. For each of the test pieces immersed for 7 days, the volume resistivity and the weight change rate were determined in accordance with JIS K6911.
[Hydrochloric Acid (HCl) Immersion Treatment]

Hydrochloric acid (38%) was poured into a glass beaker, and dumbbell test pieces according to JIS K7137-2-A that were obtained from the composite resin materials of the below-described Examples and Comparative Examples were each added thereto and immersed for 7 days. For each of the test pieces immersed for 7 days, the volume resistivity and the weight change rate were determined in accordance with JIS K6911.
[Ammonia Immersion Treatment]

Ammonia (28%) was poured into a glass beaker, and dumbbell test pieces according to JIS K7137-2-A that were obtained from the composite resin materials of the below-described Examples and Comparative Examples were each added thereto and immersed for 7 days. For each of the test pieces immersed for 7 days, the volume resistivity and the weight change rate were determined in accordance with JIS K6911.
[SC-1 Immersion Treatment]

In a glass beaker, ammonia (28%), hydrogen peroxide and pure water were mixed at a weight ratio of 1:1:5 to prepare SC-1. Dumbbell test pieces according to JIS K7137-2-A that were obtained from the composite resin materials of the below-described Examples and Comparative Examples were each added thereto and immersed for 7 days. For each of the test pieces immersed for 7 days, the volume resistivity and the weight change rate were determined in accordance with JIS K6911.
[SC-2 Immersion Treatment]

In a glass beaker, hydrochloric acid (38%), hydrogen peroxide and pure water were mixed at a weight ratio of 1:1:6 to prepare SC-2. Dumbbell test pieces according to JIS K7137-2-A that were obtained from the composite resin materials of the below-described Examples and Comparative Examples were each added thereto and immersed for 7 days. For each of the test pieces immersed for 7 days, the volume resistivity and the weight change rate were determined in accordance with JIS K6911.
[Resin Particles]

In the following Examples and Comparative Examples, the PCTFE particles or modified polytetrafluoroethylene (modified PTFE) particles shown in Table 1 below were used. It is noted here that the PCTFE particles 2 and 3 were produced by pulverizing the PCTFE particles 1 at −196° C. using liquid nitrogen and subsequently classifying the resulting particles using a vibration sieve or the like.

TABLE 1

| | Average particle diameter $D_{50}$ [μm] | Specific surface area [m²/g] | Flow value [cm³/sec] | Melting point [° C.] |
|---|---|---|---|---|
| PCTFE particles 1 | 433.8 | 2.8 | 1.05 | 209 |
| PCTFE particles 2 | 10.3 | 2.9 | 1.40 | 209 |
| PCTFE particles 3 | 286.6 | 2.1 | 1.18 | 213 |
| Modified PTFE particles | 19.6 | 1.2 | — | 341 |

Example 1

First, 500 g of a carbon nanotube dispersion using water as a solvent (dispersant=0.15% by mass, carbon nanotubes=0.025% by mass) was diluted by adding thereto 3,500 g of ethanol. Then, 1,000 g of the PCTFE particles 2 was added to the resultant to prepare a mixed slurry.

Next, the thus prepared mixed slurry was fed to a pressure-resistant vessel, and liquid carbon dioxide was fed thereto at a rate of 0.03 g/min with respect to 1 mg of the dispersant contained in the mixed slurry in the pressure-resistant vessel, after which the pressure and the temperature inside the pressure-resistant vessel were raised to 20 MPa and 50° C., respectively. While maintaining the pressure and the temperature for 3 hours, carbon dioxide was discharged from the pressure-resistant vessel along with the solvents (water and ethanol) and the dispersant that were dissolved in carbon dioxide.

Thereafter, the pressure and the temperature inside the pressure-resistant vessel were reduced to atmospheric pressure and normal temperature so as to remove carbon dioxide from the pressure-resistant vessel, whereby a CNT composite resin material was obtained.

Example 2

A resin material of Example 2 was obtained in the same manner as in Example 1, except that the amount of the CNTs was changed to 0.05% by mass based on the composite resin material to be obtained.

Example 3

A resin material of Example 3 was obtained in the same manner as in Example 1, except that the amount of the CNTs was changed to 0.1% by mass based on the composite resin material to be obtained.

Example 4

A resin material of Example 4 was obtained in the same manner as in Example 1, except that the amount of the CNTs was changed to 0.125% by mass based on the composite resin material to be obtained.

Example 5

A resin material of Example 5 was obtained in the same manner as in Example 1, except that the amount of the CNTs was changed to 0.15% by mass based on the composite resin material to be obtained.

Example 6

A resin material of Example 6 was obtained in the same manner as in Example 3, except that the PCTFE 3 was used in place of the PCTFE 2.

Comparative Example 1

The PCTFE 1 that was not made into a composite with CNTs was used as Comparative Example 1.

Comparative Example 2

A resin material of Comparative Example 2 was obtained in the same manner as in Example 3, except that the PCTFE 1 was used in place of the PCTFE 2.

Comparative Example 3

The PCTFE 2 that was not made into a composite with CNTs was used as Comparative Example 3.

Comparative Example 4

A resin material of Comparative Example 4 was obtained in the same manner as in Example 1, except that the modified PTFE particles were used in place of the PCTFE 2.

Comparative Example 5

A resin material of Comparative Example 5 was obtained in the same manner as in Comparative Example 4, except that the amount of the CNTs was changed to 0.05% by mass based on the composite resin material to be obtained.

Comparative Example 6

A molded body obtained by alternately laminating and solidifying PFA and carbon fibers in the form of layers was used as a resin material of Comparative Example 6.

Comparative Example 7

A resin material of Comparative Example 7 was obtained by adding 15% by mass of graphite as a filler to PTFE.

Comparative Example 8

A resin material of Comparative Example 8 was obtained by adding 15% by mass of carbon fibers as a filler to PTFE.

For the resin materials obtained in the above-described Examples and Comparative Examples, the average particle diameter and the specific surface area were measured in accordance with the above-described respective measurement methods. The results thereof are shown in Table 2. Further, the results of measuring the volume resistivity for the molded bodies produced in accordance with the above-described method using the resin materials obtained in Examples and Comparative Examples are also shown in Table 2.

TABLE 2

| | | PCTFE | Amount of CNTs [% by mass] | Average particle diameter $D_{50}$ [μm] | Specific surface area [m²/g] | Volume resistivity [Ω · cm] |
|---|---|---|---|---|---|---|
| Example | 1 | PCTFE 2 | 0.025 | 10.0 | 2.7 | $10^8$ |
| | 2 | PCTFE 2 | 0.05 | 10.2 | 2.1 | $10^5$ |
| | 3 | PCTFE 2 | 0.1 | 11.5 | 2.6 | $10^2$ |
| | 4 | PCTFE 2 | 0.125 | 11.2 | 2.2 | $10^2$ |
| | 5 | PCTFE 2 | 0.15 | 12.2 | 2.8 | $10^2$ |
| | 6 | PCTFE 3 | 0.1 | 266.6 | 2.6 | $10^2$ |
| Comparative Example | 1 | PCTFE 1 | 0 | 433.8 | 2.8 | $>10^{14}$ |
| | 2 | PCTFE 1 | 0.1 | 640.0 | 3.7 | $10^3$ |
| | 3 | PCTFE 2 | 0 | 10.3 | 2.9 | $>10^{14}$ |
| | 4 | modified PTFE | 0.025 | 30.0 | 1.0 | $10^7$ |
| | 5 | modified PTFE | 0.05 | 30.4 | 1.8 | $10^2$ |
| | 6 | PFA/carbon fiber laminate | — | — | — | $10^{-1}$ |
| | 7 | PTFE/graphite | — | — | — | $>10^{14}$ |

TABLE 2-continued

| | PCTFE | Amount of CNTs [% by mass] | Average particle diameter $D_{50}$ [μm] | Specific surface area [m²/g] | Volume resistivity [Ω·cm] |
|---|---|---|---|---|---|
| 8 | PTFE/carbon fiber | — | — | — | $10^1$ |

With regard to the molded bodies produced in accordance with the above-described method using the resin materials obtained in Examples and Comparative Examples, the results of measuring the tensile elastic modulus, the tensile strength and the tensile elongation (breaking point) are shown in Table 3.

TABLE 3

| | | Tensile elastic modulus [MPa] | Tensile strength [MPa] | Tensile elongation [%] |
|---|---|---|---|---|
| Example | 1 | 1,410 | 39 | 49 |
| | 2 | 1,244 | 39 | 45 |
| | 3 | 1,378 | 40 | 22 |
| | 4 | 1,161 | 39 | 25 |
| | 5 | 1,186 | 38 | 21 |
| | 6 | 1,184 | 40 | 15 |
| Comparative Example | 1 | 1,142 | 42 | 112 |
| | 2 | 1,142 | 41 | 16 |
| | 3 | 1,390 | 38 | 50 |
| | 4 | 526 | 31 | 353 |
| | 5 | 443 | 31 | 367 |

With regard to the molded bodies produced in accordance with the above-described method using the resin materials obtained in Examples 3 and Comparative Examples 5 to 8, the results of measuring the volume resistivity after the IPA immersion treatment, after the thinner immersion treatment, after the hydrogen peroxide immersion treatment, after the SPM immersion treatment, after the HCl immersion treatment, after the SC-1 immersion treatment, after the SC-2 immersion treatment and after the aqueous ammonia immersion treatment are shown in Table 4.

TABLE 4

Volume resistivity after 7-day immersion

| | | Volume resistivity [Ω·cm] | | | | |
|---|---|---|---|---|---|---|
| | | Untreated | After IPA immersion treatment | After thinner immersion treatment | After hydrogen peroxide immersion treatment | After SPM immersion treatment |
| Example | 3 | $10^2$ | $10^2$ | $10^3$ | $10^2$ | $10^1$ |
| Comparative | 5 | $10^2$ | $10^2$ | $10^2$ | $10^2$ | — |
| Example | 6 | $10^{-1}$ | $10^0$ | $10^3$ | $10^2$ | $10^{-1}$ |
| | 7 | $>10^{14}$ | $>10^{14}$ | $>10^{14}$ | $>10^{14}$ | — |
| | 8 | $10^1$ | $10^2$ | $10^1$ | $10^2$ | — |

TABLE 4-continued

Volume resistivity after 7-day immersion

| | | Volume resistivity [Ω·cm] | | | |
|---|---|---|---|---|---|
| | | After HCl immersion treatment | After SC-1 immersion treatment | After SC-2 immersion treatment | After aqueous ammonia immersion treatment |
| Example | 3 | $10^1$ | $10^1$ | $10^2$ | $10^2$ |
| Comparative | 5 | $10^2$ | $10^2$ | $10^2$ | $10^2$ |
| Example | 6 | $10^2$ | $>10^4$ | $10^2$ | $10^{-3}$ |
| | 7 | $>10^{14}$ | $>10^{14}$ | $>10^{14}$ | $>10^{14}$ |
| | 8 | $>10^{14}$ | $>10^7$ | $10^1$ | $10^1$ |

With regard to the molded bodies produced in accordance with the above-described method using the resin materials obtained in Examples 3 and Comparative Examples 5 to 8, the results of measuring the weight change rate after the IPA immersion treatment, after the thinner immersion treatment, after the hydrogen peroxide immersion treatment, after the SPM immersion treatment, after the HCl immersion treatment, after the SC-1 immersion treatment, after the SC-2 immersion treatment and after the aqueous ammonia immersion treatment are shown in Table 5.

TABLE 5

Weight change rate after 7-day immersion

| | | Weight change rate [%] | | | | |
|---|---|---|---|---|---|---|
| | | Untreated | After IPA immersion treatment | After thinner immersion treatment | After hydrogen peroxide immersion treatment | After SPM immersion treatment |
| Example | 3 | 0.00 | −0.01 | 0.03 | 0.01 | −0.06 |
| Comparative | 5 | 0.00 | 0.01 | 0.01 | 0.02 | — |
| parative | 6 | 0.00 | 0.19 | 0.39 | −0.05 | 2.16 |
| Example | 7 | 0.00 | −0.04 | 0.04 | −0.02 | — |
| | 8 | 0.00 | 0.13 | 0.40 | −0.02 | — |

| | | Weight change rate [%] | | | |
|---|---|---|---|---|---|
| | | After HCl immersion treatment | After SC-1 immersion treatment | After SC-2 immersion treatment | After aqueous ammonia immersion treatment |
| Example | 3 | 0.00 | 0.05 | 0.00 | 0.01 |
| Comparative | 5 | 0.03 | 0.01 | 0.03 | 0.04 |
| Example | 6 | 0.14 | 0.10 | 0.14 | 0.02 |
| | 7 | 0.04 | 0.01 | 0.04 | −0.02 |
| | 8 | 0.01 | 0.00 | 0.01 | −0.01 |

With regard to the molded bodies produced in accordance with the above-described method using the resin materials obtained in Examples 1 to 3 and Comparative Examples 3 to 5, the results of measuring the compressive elastic modulus, the compressive strength, the bending elastic modulus and the bending strength are shown in Table 6.

TABLE 6

|  |  | Compressive elastic modulus [MPa] | Compressive strength [%] | Bending elastic modulus [MPa] | Bending strength [MPa] |
|---|---|---|---|---|---|
| Example | 1 | 1,159 | 12 | 1,641 | 67 |
|  | 2 | 1,204 | 11 | 1,639 | 67 |
|  | 3 | 1,180 | 12 | 1,763 | 71 |
| Comparative | 3 | 1,153 | 11 | 1,850 | 69 |
| Example | 4 | 510 | 5 | 428 | 15 |

FIG. 1 showed an image of the CNTs in the molded body produced by compression-molding the resin material obtained in Example 3 (in accordance with the above-described "Production of Molded Body"). The average length of the CNTs shown in FIG. 1 was 100 μm.

FIG. 2 showed an image of the CNTs in a molded body produced by melt-kneading the resin material obtained in Example 3. More specifically, this molded body was produced by melt-kneading. The average length of the CNTs shown in FIG. 2 was 30 μm. The average length can be determined by scale measurement under a scanning electron microscope (SEM or FE-SEM) or a transmission electron microscope (TEM).

The invention claimed is:

1. A composite resin material, comprising a polychlorotrifluoroethylene and carbon nanotubes and having an average particle diameter of 500 μm or smaller and a specific surface area of 1.0 to 6.0 m$^2$/g as measured by a BET method.

2. The composite resin material according to claim 1, comprising the carbon nanotubes in an amount of 0.01 to 2.0% by mass based on a total amount of the composite resin material.

3. The composite resin material according to claim 1, having a volume resistivity of $1.0 \times 10^8$ Ω·cm or lower as measured in accordance with JIS K6911.

4. The composite resin material according to claim 1, wherein the polychlorotrifluoroethylene has a flow value of 0.8 cm$^3$/sec or higher.

5. A molded body produced using the composite resin material according to claim 1.

6. The molded body according to claim 5, wherein the carbon nanotubes have an average length of 50 μm or longer.

7. The molded body according to claim 5, having a shape selected from the group consisting of a plate shape, a rod shape, a film shape, a sheet shape, an aggregate shape, and a tubular shape.

* * * * *